United States Patent
Oginski et al.

(10) Patent No.: US 10,247,352 B2
(45) Date of Patent: Apr. 2, 2019

(54) ROTATABLE CONNECTION WITH A ROTATIONAL ANGLE LIMITATION

(71) Applicant: Ondal Medical Systems GmbH, Hünfeld (DE)

(72) Inventors: Stefan Oginski, Fulda (DE); Ronny Bauditz, Suhl (DE); Andreas Gobel, Eiterfeld (DE); Annika Euler, Hünfeld (DE)

(73) Assignee: ONDAL MEDICAL SYSTEMS GMBH, Hünfeld (DE)

( * ) Notice: Subject to any disclaimer, the term of this patent is extended or adjusted under 35 U.S.C. 154(b) by 725 days.

(21) Appl. No.: 14/695,332

(22) Filed: Apr. 24, 2015

(65) Prior Publication Data

US 2015/0308611 A1 Oct. 29, 2015

(30) Foreign Application Priority Data

Apr. 24, 2014 (EP) .................................... 14001482

(51) Int. Cl.
*F16M 11/20* (2006.01)
*F16M 11/06* (2006.01)
(Continued)

(52) U.S. Cl.
CPC ......... *F16M 11/2007* (2013.01); *F16M 11/06* (2013.01); *F16M 11/08* (2013.01);
(Continued)

(58) Field of Classification Search
CPC ...... E05D 11/10; E05D 11/1007; F16C 11/10; F16M 13/022; F16M 13/027;
(Continued)

(56) References Cited

U.S. PATENT DOCUMENTS 1,634,922 A * 7/1927 Stubblebine ........... B60N 2/143
    248/418
3,713,618 A * 1/1973 Hendrickson ............ A47C 3/18
    248/417
(Continued)

FOREIGN PATENT DOCUMENTS

CN 102762877 2/2016
DE 3808327 9/1988
(Continued)

OTHER PUBLICATIONS

EP 14001479, dated Oct. 12, 2014, European Search Report.

*Primary Examiner* — William L Miller
(74) *Attorney, Agent, or Firm* — Workman Nydegger

(57) ABSTRACT

A rotatable connection for a stand apparatus for arrangement in an operating room, including an adjustable stop mechanism, which can be arranged between a first connection component and a second connection component mounted rotatably about a rotational axis relative to the first connection component and which is configured to define different rotational angles or rotation ranges of the connection components relative to each other. The adjustable stop mechanism includes: a stop ring which can be mounted to the first connection component in an anti-rotational manner, an anti-rotation device, a stop device with a counter stop, and a rotary block. The stop device can be positioned at the anti-rotation device in different rotational angle positions in an anti-rotational manner. A support system or a stand apparatus with such a rotatable connection and a method for adjusting the adjustable stop mechanism are provided.

15 Claims, 4 Drawing Sheets

Figure 1A:
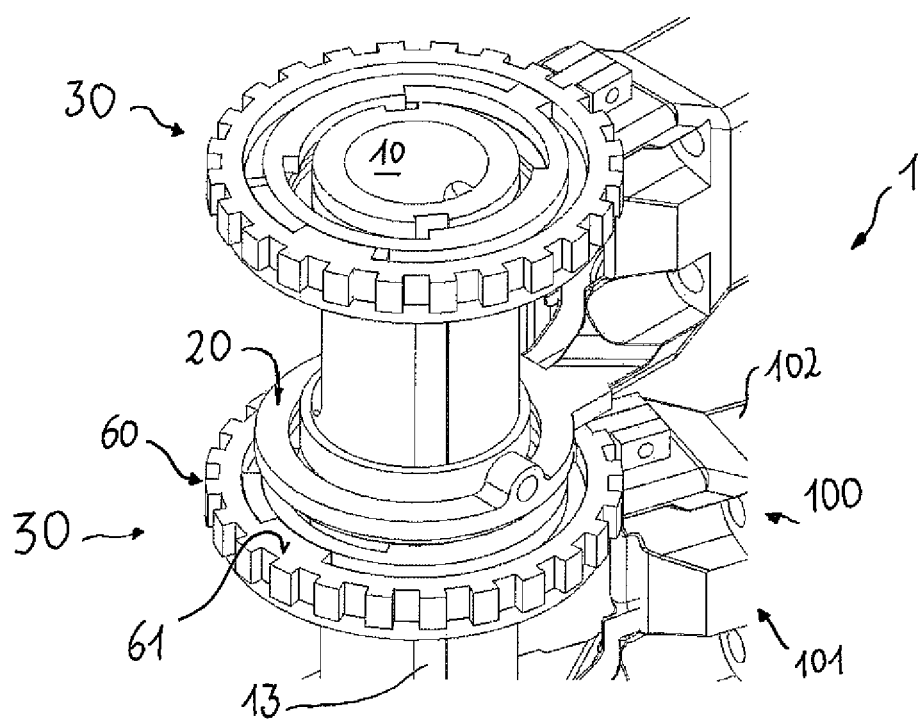

(51) Int. Cl.
*F16M 11/08* (2006.01)
*F16M 13/02* (2006.01)

(52) U.S. Cl.
CPC ...... *F16M 11/2014* (2013.01); *F16M 13/027* (2013.01); *F16M 2200/024* (2013.01); *Y10T 16/54028* (2015.01)

(58) Field of Classification Search
CPC .... F16M 11/2014; F16M 11/08; F16M 11/06; F16M 11/2007; F16M 2200/024; A61B 19/26; Y10T 16/54; Y10T 16/54028; Y10T 16/551; Y10T 403/32549; Y10T 403/32254; Y10T 403/32262; Y10T 403/32319; Y10T 403/32327; Y10T 403/32336; Y10T 403/32344; Y10T 403/32368; Y10T 403/32385; Y10T 403/32409; Y10T 403/32418
USPC ............... 16/319, 334, 374; 248/418, 288.1; 403/112, 83, 84, 91–94, 97, 99, 102, 103
See application file for complete search history.

(56) References Cited

U.S. PATENT DOCUMENTS

| | | | |
|---|---|---|---|
| 5,123,768 A | 6/1992 | Franklin | |
| 6,079,949 A | 6/2000 | Litvin | |
| 6,471,363 B1 | 10/2002 | Howell et al. | |
| 7,452,088 B2 | 11/2008 | Brester et al. | |
| 8,056,874 B2 | 11/2011 | Goodwin et al. | |
| 8,070,331 B2* | 12/2011 | Gull | F16M 11/08 362/285 |
| 8,209,816 B2 | 7/2012 | Heger et al. | |
| 8,591,444 B2 | 11/2013 | Bejarano et al. | |
| 9,022,339 B2 | 5/2015 | Borg et al. | |
| 9,239,127 B2* | 1/2016 | Kronung | F16C 11/10 |
| 9,280,037 B2 | 3/2016 | Leblanc et al. | |
| 9,719,560 B2 | 8/2017 | Dreizler | |
| 2005/0121578 A1 | 6/2005 | Asamarai et al. | |
| 2006/0285915 A1 | 12/2006 | Dellach et al. | |
| 2009/0213596 A1 | 8/2009 | Gull et al. | |
| 2011/0314637 A1 | 12/2011 | Bejarano et al. | |
| 2012/0014744 A1 | 1/2012 | Lin | |
| 2012/0059274 A1 | 3/2012 | Zoth et al. | |
| 2012/0228454 A1* | 9/2012 | Kronung | F16C 11/10 248/288.11 |
| 2013/0189019 A1 | 7/2013 | Kotula et al. | |
| 2014/0105670 A1 | 4/2014 | Plomteux et al. | |
| 2014/0314538 A1* | 10/2014 | Carter | A61B 19/26 414/744.3 |
| 2015/0366627 A1* | 12/2015 | Oginski | A61B 19/26 248/288.11 |
| 2015/0377283 A1* | 12/2015 | Oginski | F16C 11/10 16/319 |
| 2016/0102702 A1 | 4/2016 | Lang et al. | |
| 2016/0102802 A1* | 4/2016 | Oginski | F16M 11/08 248/418 |
| 2016/0281915 A1 | 9/2016 | Bowman et al. | |
| 2017/0332977 A1 | 11/2017 | Oginski et al. | |
| 2018/0106291 A1 | 4/2018 | Oginski et al. | |

FOREIGN PATENT DOCUMENTS

| | | |
|---|---|---|
| DE | 4306802 | 8/1994 |
| DE | 102008011129 | 8/2009 |
| EP | 0392303 | 10/1990 |
| EP | 0614037 | 3/1994 |
| EP | 1473473 B1 | 9/2006 |
| EP | 2325541 B1 | 5/2013 |
| EP | 2096349 B1 | 9/2013 |
| EP | 2937617 | 10/2015 |
| EP | 2937618 | 10/2015 |
| EP | 2937619 | 10/2015 |
| FR | 1341061 | 10/1963 |

* cited by examiner

ROTATABLE CONNECTION WITH A ROTATIONAL ANGLE LIMITATION

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Embodiments of the invention relate to a rotatable connection for a stand apparatus. Embodiments of the invention further relate to a rotatable connection for a stand apparatus for arrangement in an operating room.

BRIEF SUMMARY OF THE INVENTION

The present invention relates to a rotatable connection for a stand apparatus for arrangement in an operating room, comprising an adjustable stop mechanism, which can be arranged between a spindle and a sleeve mounted rotatably relative to the spindle and which is configured to define different rotational angles and/or rotation ranges of the spindle relative to the sleeve. The present invention relates in particular to a rotatable connection with individual characteristics of claim 1 and a support system or a stand apparatus with individual characteristics of the corresponding further independent claim and a method for adjusting the adjustable stop mechanism with individual characteristics of the corresponding independent method claim.

Stands, in particular ceiling stands as e.g. ceiling supply units, monitor supports, or so-called spring arms or central axes, mostly have one or several supports arranged rigidly or height-adjustable with respect to a vertical position, by means of which a medical device attached thereto can be moved and positioned, e.g. in an operating room, in particular also in an intensive care unit. Supply units are often mounted to the stands, with which supply units medical electrical end devices can e.g. be supplied with the media required during an operation. The supports thereby define an action radius of medical device, in which the medical device is positioned. The supports can mostly be rotated about at least one rotatable connection, in particular a pivot joint. The supports are optionally also height-adjustable and/or are pivotably arranged around an axis aligned at least approximately horizontally.

A rotational movement of individual supports, be it is an absolute rotational movement or a rotational movement relative to another support shall be limited to a predetermined angle in many cases. Hereby it can e.g. be avoided that a support is rotated by more than 360° with respect to another support and that leads guided in the support are thereby twisted, pinched or even torn. A rotational angle limitation can e.g. be provided in the form of a stop, at which a support abuts at a certain rotational angle, e.g. 300°. The stop can e.g. be rigidly attached to the support, particularly in the form of a securing pin introduced into the radial direction. The stop thereby prescribes a predefined rotational angle. Such a rotational angle limitation can ensure that a maximum rotational angle is not exceeded, but also often has the disadvantage that the freedom of movement of the stand is restricted, so that e.g. a supply unit of the stand can no longer be arranged in arbitrary positions. The action radius of the stand is limited, in particular without considering a certain theater situation. It has therefore be considered in each individual case by which stop the rotational angle limitation can or should be defined. The correct interpretation of the rotational angle limitation, in particular an adequate positioning of the stop, can however already present difficulties during the production of a respective stand, in particular if it is not yet clear at which location the stand is to be used in each case. Therefore, rotational angle limitations are practical, by means of which a rotational angle or a rotational position can be adjusted subsequently.

A device with an adjustable rotational angle is known from EP 2 325 541 B1. In EP 2 325 541 B1 is described a two-part adjustable stop mechanism is described, where an annular part can be selectively positioned externally around a circumference of a first support or a hinge of the first support, and the annular part has a plurality of recesses or protrusions arranged on the face, by means of which it can positioned in a simple manner in different rotational angle positions relative to the first support. A stop is further arranged at the annular part, to which stop a second support can abut. By means of the annular part, a rotational angle of the two supports can be adjusted relative to each other. The stop mechanism is thereby arranged within a collar of the second support. The annular part can be raised into a groove surrounding an outer casing surface of the annular part in order to position the annular part in a desired rotational angle position relative to the first support. Further, another annular part is provided at the first support, which can be positioned relative to the annular part. The two annular parts are arranged within the collar and are enclosed and covered radially outwardly by the collar. In the collar is arranged a securing pin introduced in the radial direction, which engages an intermediate space formed between the two annular parts. By means of the relative rotational position of the stop ring relative to the rotation lock, the extension of the intermediate space is defined in the circumferential direction. The angle range by which the two supports can be rotated relative to each other can be defined by the extension of the intermediate space in the circumferential direction. The stop mechanism is thereby arranged substantially at the first support and cooperates with the second support introduced radially. The rotatable connection of EP 2 325 541 B1 does not have the flexibility of the rotatable connection of the present invention, as only specific rotational angles can be adjusted, but no rotational angle ranges.

In DE 38 08 327 A1 is described a stop mechanism in which a threaded bolt can be displaced in the radial direction in a threaded bore in order to adjust different rotational angle positions.

EP 2 096 349 A2 describes a rotatable connection for a stand apparatus in which a rotation lock is provided with the aid of a screw attached to a coupling element as a blocking element.

EP 1 473 473 A1 describes a blocking brake for fixing the position of a stand in operating rooms. The rotation device does not have the flexibility of the rotatable connection of the present invention, as only specific rotational angles can be adjusted, but no rotational angle ranges.

It is an object of the present invention to provide a rotatable connection by means of which a rotation (angle) range can be adjusted in a simple manner, in particular also with a relative rotational angle of above 360°. In particular, the object also consists in providing a stand apparatus with a rotational angle limitation, in which individual supports of the stand apparatus can be displaced in a flexible manner in an operating room, thanks to an adjustable rotatable connection, in particular in a pre-definable action radius by means of the rotatable connection.

This object is solved by a rotatable connection for a stand apparatus for arrangement in an operating room, comprising an adjustable stop mechanism, which can be arranged between a first connection component (in particular a connection component of the rotatable connection) and a second connection component (in particular a connection component of the rotatable connection) mounted rotatably about a rotational axis (R) relative to the first connection component and which is configured to define different rotational angles and/or rotation ranges of the connection components relative to each other, wherein the adjustable stop mechanism (30) has:
- a stop ring having at least one stop and which can be mounted to the first connection component in an anti-rotational manner;
- an anti-rotation device, which can be arranged at the second connection component in an anti-rotational manner;
- a stop device with a counter stop, which is mounted rotatably relative to the stop ring; and
- a rotary block, which is mounted relative to the stop ring and relative to the stop device in a rotation-blocking manner;

wherein the stop device can be positioned at the anti-rotation device in different rotational angle positions in an anti-rotational manner and is configured to define a respective rotation range by means of the counter stop together with the rotary block and the stop ring by means of relative rotation of these components to each other. An adjustable rotatable connection can hereby be provided in a simple or flexible manner. The adjustment can take place e.g. by rotating the stop device relative to the second connection component, in particular also manually. The stop device can be arranged in different rotational positions relative to the second connection component and in particular be fixed in a purely form-fit manner. The counter stop can thereby be fastened to the stop device in a predetermined position. A repositioning of a stop of the rotary block within a ring cavity formed between the rotary block and the stop device can optionally also take place. In other words, the stop mechanism can also be adjusted in that a rotational play between the stop device and the rotary block is predetermined.

The invention is thereby based on the understanding that, by means of relative rotational movements between several components, in particular by means of three relative rotational movements, a large variance or flexibility of the stop device can be achieved without having to design the entire assembly in an elaborate constructive manner. A relative rotational movement can on the one hand take place between the stop device and the stop ring, and on the other hand also between the stop device and the rotary block and between the rotary block and the stop ring.

The invention is based on the concept to adjust the stop mechanism by (optionally also manually or even without tools) changing or adjusting a permissible rotational angle between the stop device and the rotary block. The permissible rotational angle between the stop device and the rotary block can thereby be adjusted solely by the relative arrangement of individual components of the rotatable connection relative to each other without structural changes. Optionally, a very specific permissible rotational angle between the rotary block and the stop ring can be predetermined, in particular by (e.g. constructive) dimensioning of a counter stop of the rotary block in the circumferential direction.

It is thereby possible to define different rotational angles and also different rotation ranges, thus e.g. a rotation range from compass North (thus the geographic North direction) about e.g. 360° in the clockwise and counterclockwise direction, or a rotation range starting from compass East about 360°, or a rotation range from compass North about 380° or 125°. The action radius of e.g. a stand device can thereby also be adapted and adjusted with regard to an arrangement near a wall or in a corner. The rotary block can thereby bridge a rotational angle range, in particular a rotational angle range that, due to the design (e.g. minimum size due to stability reasons) cannot be used by any stops. A particularly flexibly adjustable rotatable connection can be provided by means of an interposed rotary block. The (absolute/maximum) amount of the rotational angle to be bridged is rigidly predefined by the geometrical configuration of the stop device mechanism, in particular of the rotary block, for example, 60°, 80° or 120°. The starting point or end point of the rotational movement can be adjusted in a particularly simple manner in that the stop device is positioned relative to the second connection component.

The number of components can also be kept low by means of a rotary block mounted between the stop device and the stop ring. The entire stop mechanism is preferably composed of only three components mounted relatively rotatable to each other, in particular the stop ring, the rotary block and the stop device.

The joint or mounting of the rotary block described as being anti-rotational relative to the or at the stop ring or the stop device can thereby be provided by two abutting stops or which can be brought into engagement with each other in the form of projections, as well as by a form-fit joint. The rotary block is arranged rotatably about the rotational axis, in particular together with the second connection component and the stop device. A rotational movement of the second connection component can be transferred to the rotary block via the stop device as soon as the stop abuts a stop of the rotary block. The rotary block can be rotated together with the stop device with a form-fit engagement. The rotary block can then be rotated, either in the clockwise or counterclockwise direction. The rotary block is mounted in an indeterminate manner in the rotational direction. The rotation-blocking arrangement with rotation play can be ensured hereby. Only when the respective stops abut each other, the relative rotational position of the rotary block is determined relative to the stop device or relative to the stop ring. A rotation-blockable arrangement can thus comprise an arrangement in which a relative rotational movement between the rotary block and the stop device or the stop ring is indeed possible, but which is restricted by any stop at a specific angle. As soon as the stop device abuts a stop of the rotary block, a relative rotational movement between the rotary block and the second connection component is no longer possible in the corresponding rotational direction. In other words: with a rotation-blocked arrangement, the rotary block can only be rotated in a specific rotational angle range relative to the second connection component. By means of a rotation-blockable arrangement, a comparatively large rotational angle range, in particular with a rotational angle greater than 360° can be adjusted, e.g. 380°, 400° or 460°.

The joint or mounting of the stop ring to the or on the first connection component described as an anti-rotation device can thereby be provided e.g. by a groove-spring joint, in particular by a joint which defines only a single relative position of the two parts to each other.

Preferably, the stop ring has at least one form-fit element which can engage in an rotation lock of the first connection component, in particular in a groove. Preferably, the form-fit element (as opposed to the stop of the stop ring) is decoupled from the stop device and the rotating block, thus does not cooperate with the stop device or the rotary block, at least not in terms of a coupled rotation.

The joint or mounting of the stop ring to the or on the first connection component described as an rotation lock can thereby be provided e.g. by webs or projections, in particular by a joint in which an engagement of the two components can be adjusted. An anti-rotation arrangement, joint or mounting of the rotation lock on the second connection component can thereby also comprise an arrangement in which a part or section of the rotation lock (in one piece) is formed as an integral part of the second connection component. In particular, a web of the rotation lock can be integrated in a second connection component as a sleeve (e.g. cast).

Preferably, the stop ring is indeed mounted to the first connection component against rotation, but preferably only with regard to a rotational movement. In other words: the anti-rotation arrangement does not necessarily involve a predefined axial position. Rather, the stop ring can be mounted to e.g. one of the other components of the stop mechanism or the rotatable connection in the axial direction.

A rotatable connection is thereby preferably understood to be an arrangement by means of which a rotation of two components with each other by a predetermined angle can be ensured. The rotatable connection is e.g. a joint between a sleeve and a spindle, wherein the rotatable connection does not necessarily comprise the sleeve and the spindle, but e.g. only the bearings or bearing surfaces provided thereon for them. The rotatable connection preferably has at least one pivot joint or forms a part of the pivot joint. A pivot joint is thereby preferably meant to be a joint, which permits at least one rotation about one or several rotational axes, whereby a translational degree of freedom can also be realized. The pivot joint is preferably arranged at the interface between two individual supports, but it can also divide a single support into several sections. The pivot joint can e.g. be provided at the interface between a spindle and a sleeve.

A stand apparatus is thereby preferably understood to be a device for holding, fixedly arranging and/or displacing at least one medical device which can be fixedly mounted to a wall (in a wall mount) or a ceiling or also on the floor of an operating room or any other room for medical purposes, thus e.g. ceiling stand. The stand apparatus then cannot be displaced completely freely in the operating room, but can only be displaced with a certain action radius, particularly relative to a fastening point or assembly point arranged on a ceiling or wall of the operating room. The stand apparatus can be formed as a ceiling supply unit mounted to a ceiling and can have one or several supply consoles which is mounted and positioned at one or two support arms. The stand apparatus can also be formed as a monitor support. The stand apparatus can also be formed as a so-called spring arm, in particular mounted to a wall and have e.g. a lamp. The stand apparatus can also be formed as a so-called central axis, in particular mounted on a ceiling and have a plurality of support systems, with respectively at least one support, to which is mounted e.g. a monitor or a lamp. However, the stand apparatus does not necessarily have to be firmly mounted to a wall, but can also be mounted to a mobile base. The mobile base can be positioned in a fixed manner in the room, e.g. by means of brakes. In this case, an adjustable stop mechanism is also useful.

An adjustable stop mechanism is thereby preferably understood to be any adjustable device that can limit a rotational angle and/or rotation range of a support, particularly relative to another support or relative to a (fictional) rotational axis fixedly positioned in the room, e.g. a rotational axis proceeding through a fixedly arranged fastening point at a wall of a room. Preferably, the adjustable stop mechanism also has at least a joint formed as a form-fit or is formed as a form-fit. The adjustable stop mechanism can additionally act in a force-fitting manner.

A rotation range is thereby preferably understood to be a rotational angle range, in which a support may be rotated relative to another support or to a wall. The angle range can e.g. be 330° or more than 360°. The angle range can be constant in size, but can e.g. be defined in terms of different circumferential positions, thus e.g. from 0° to 300° with regard to a North direction, or from 30° to 330° with regard to the North direction. The rotation range can e.g. be defined by different rotational angle positions of the stop device relative to the second connection component.

A stop device is thereby preferably understood to be a component which is configured to provide a counter stop in a fixed position relative to one of the connection components, in particular relative to the second connection component, wherein a (twisting) force, thus a torque, exerted on the stop device in the circumferential direction can be transferred via the counter stop between the connection components. The stop device is preferably configured to prevent a direct cooperation between the stop ring or the rotary block and the rotation lock. The stop device is preferably mounted between the stop ring and the anti-rotation or between the block and the rotation lock and is configured to transfer a torque between the stop ring and the rotation lock. The stop device preferably extends at least in sections around the rotational axis, wherein the stop device is preferably ring-shaped and is provided peripherally around the rotational axis. The stop device can then e.g. be described as an adjustment ring. The stop device can e.g. be ring-shaped and have at least one form-fit contour in the form of a toothing, e.g. a saw tooth contour which extends along the entire circumference of the stop device, in particular at the interface to prevent rotation. The stop device can then also be referred to as a gear ring.

A counter stop is thereby preferably understood to be any form-fit contour such as a protrusion, ledge or a projecting nose. The counter stop is preferably fixedly positioned at the stop device. The counter stop can be provided integrally on the stop device, i.e., the stop device forms a one-piece part with the counter stop. The counter stop or at least a counter stop of a plurality of counter stops can optionally also be fastened to the stop device, e.g. by means of a screw connection in the radial or axial direction. This facilitates e.g. the adjusting of a certain rotational angle.

A stop ring is thereby preferably understood to be a component which is coupled in any manner to the rotational movement of the first connection component (e.g. a spindle) in an anti-rotation manner, and preferably cooperates with the first connection component in a form-fit manner, e.g. by means of form-fit elements in the form of springs. The stop ring can thereby preferably be displaced in the axial direction relative to the first connection component. This permits e.g. a simple installation. In the circumferential direction, a relative displacement to each other is blocked or can be blocked from a certain angle. The stop ring has at least one stop in particular on an outer casing surface, wherein a stop is understood to be any form-fit contour as e.g. a protrusion or ledge projecting in the radial direction. The stop ring is preferably not identical with the first connection component.

An rotation lock is thereby preferably understood to be a component which is coupled to the rotational movement of the second connection component (e.g. a sleeve) in an anti-rotational manner and can cooperate with the stop device in a form-fit manner, in particular in a rotationally synchronous manner. The rotation lock is thereby provided on the second connection component in such a manner that the rotation lock and the second connection component perform the same rotational movement in any case. The position of the rotation lock relative to the second connection component is preferably predefined and cannot be changed. The rotation lock can at least partially be formed by the second connection component, e.g. be cast on. The rotation lock is preferably only connected to the second connection component or formed thereby, and is decoupled from the rotary block or the stop ring and cooperates only indirectly with the first connection component by means of the stop device and the stop ring via the rotary block and the stop ring. The rotation lock is preferably configured to mount the stop device non-rotatably in an adjustable rotational position at the second connection component, so that a stop of the rotary block can abut the stop device in order to transfer a correspondingly induced reaction force from the stop device to the first connection component. In other words: the stop ring is only indirectly connected to the ant-rotation device, in particular via the rotary block and the stop device. The anti-rotation device is preferably not identical to the stop device.

A rotary block is thereby preferably understood to be a part which is coupled to the rotational movement of the second connection component (e.g. a sleeve) in a somehow rotationally blocked manner, and cooperates with the stop ring and with the stop device in a preferably form-fit manner. In the circumferential direction, a relative displacement of these components with each other is blocked or can be blocked from a certain rotational angle. The rotary block can e.g. be annular and then be referenced as intermediate ring due to the effective checks and are preferably referred to local arrangement between the stop device and the stop ring as an intermediate ring, which defines at least one stop and at least one counter stop. A stop is thereby preferably understood to be any projecting protrusion or ledge, in particular also in the axial direction.

A rotational angle position is thereby preferably understood to be a relative rotational position of a support compared to another adjacent support or compared to an axis aligned fixedly in the room in a defined direction. The rotational angle position can also be described with regard to an absolute (horizontal) angle, e.g. about a (fictitious) vertically aligned rotational axis.

The stop device is preferably configured to transfer a rotational force acting in the circumferential direction exerted on the stop or the counter stop between the stop ring and the rotation lock, that is, from the stop ring to the rotation lock and/or from the rotation lock to the stop ring. In other words: the stop device in connection with the rotary block is configured, to couple the two components stop ring and rotation lock with each other, in particular also to define by a certain rotational angle range of parts relative to each other.

The adjustment of a rotational angle or rotation range can thereby take place e.g. in connection with the mounting of the spindle to a ceiling flange. The stop ring is thereby preferably positioned relative to a ceiling pipe via the alignment of the spindle. Several stop rings arranged on the spindle thereby preferably have the same alignment or rotational position. A first stop or a first end position for all supports of a support system of the stand device can hereby be provided at the same position. The rotation range of a respective support can then be adjusted individually by means of the respective stop device for a respective support.

According to an exemplary embodiment, the stop mechanism is configured for a sequential rotation, in particular for the rotational angle-related form-fit of the rotary block with the stop device and/or the stop ring. A sequential or stepwise rotation of individual components of the rotatable connection delivers e.g. a large rotational angle. The sequential rotation can e.g. be effected by a form fit, which only is produced in response to a specific rotational angle. Here, the rotary block can form a bridging rotary coupling part.

According to an exemplary embodiment, the stop ring, the rotary block and the stop device of the stop mechanism are arranged relative to each other in such a manner that a rotational movement can be transferred between the connection components by means of form-fit with radial clearance. A radial clearance can ensure that a particular rotational angle range can be bridged, in particular in order to ensure a rotational angle larger than 360°. The radial clearance preferably means that at least two of the components of the stop mechanism can be rotated relative to each other, without an appreciable force or torque being transmitted between these two components. The at least approximately rotation without force relative to each other can e.g. take place done by sliding at slide surfaces arranged circumferentially. Thereby, a lubrication with a lubricant or sliding means can optionally take place. However, the sliding can also take place without a lubricant or sliding means, in particular by a suitable choice of materials for the stop ring, rotary block and stop device. Alternatively or additionally, intermediate elements with good sliding properties can also be used.

According to an exemplary embodiment, the stop mechanism is configured to increase a maximum rotational angle between the connection components by means of the rotary block. The rotation-blockable arrangement of the rotary block with regard to the stop ring and with regard to the stop device can facilitate a particularly large rotational angle, in particular in a simple constructive manner. The rotary block can thereby also be described as a rotational coupling element which cooperates with the stop ring and the stop device at least in a form-fit manner. The rotary block couples a rotational movement of the stop ring with a rotational movement of the stop device and thereby defines a clearance angle at which the stop device can be rotated relative to the stop ring without the rotational movement of the stop device resulting in a rotation of the stop ring.

According to an exemplary embodiment, the stop device has a form-fit contour for defining individual rotational angle positions relative to the rotation lock, in particular a casing surface facing radially outwardly. Thereby, the starting point or the initial point of the rotational movement or of the rotational angle range can be defined by means of the stop device, in particular, by defining the relative position of the stop device relative to the rotation lock. An easily accessible or actuatable form-fit engagement can also be provided hereby, which can e.g. also be adjusted or adapted manually. Preferably, the stop device is formed as an adjustment ring with an outwardly projecting form-fit contour in the radial direction the form of a plurality of geometrically identically formed teeth or shoulders or projections or engagement edges. An adjustment ring is thereby preferably understood to be a (apart from any stops) rotationally symmetrical part, which can be positioned in different rotational angle positions, e.g. respectively offset by 15°, thus e.g. in 24 different rotational angle positions.

The rotation lock preferably has a form-fit engagement element formed geometrically corresponding to the form-fit contour. The engagement element can e.g. be a separate part of the rotation lock, which can be displaced relative to a web or any fastening surface of the anti-rotation device. A starting point or an initial point of a certain rotational angle range can thereby be adjusted at individual geometrically identically formed sections of the form-fit contour, in particular also at a rotational angle larger than 360°.

For adjusting a rotational angle or rotation range, the engagement element can e.g. be displaced in the axial and/or radial direction, so that the stop device can be rotated relative to the second connection component or re-positioned relative to the sleeve, in particular rotated about the rotational axis, and can be can be fixed in a new rotational angle position. The rotation lock can e.g. have an engagement element which is pivotally mounted on the sleeve. The engagement element can then be brought into engagement with the stop device by means of pivoting.

A form-fit contour is preferably understood to be a toothing or a tooth contour or a contour with regular ledges or projections. The shape of an individual tooth is thereby largely arbitrary. The individual tooth preferably has the form of a cuboid or, viewed in cross-section, the form of a rectangle. The form-fit contour is not necessarily solely a form-fit, but also can additionally also be in a force-fit manner, thus additionally also act by a force-fit. The form-fit contour is preferably not a material fit, in order to ensure that the stop device is reversible and can be positioned in different rotational angle positions as often as desired.

The form-fit contour of the stop device is preferably formed as a gear ring, wherein teeth of the gear ring project preferably in a radial direction at least approximately orthogonal to the rotational axis. A ring gear is thereby preferably understood to be a contour formed rotationally symmetrical with regard to the rotational axis with a plurality of individual teeth, where the teeth are arranged in a uniform distance from one another. The design as a gear ring provides e.g. the advantage of small adjustment increments, as, the more teeth are provided, the finer the starting point or initial point of the rotational angle range can be defined, for example, in increments of 10° increments.

According to an exemplary embodiment, the engagement element between an engagement position and a decoupled position can be displaced, in particular in the radial direction. An engagement of the engagement element into the form-fit contour can hereby be cancelled in a simple manner or re-established in a changed rotational angle position. The engagement element can preferably at least optionally also be displaced manually.

The rotary block is preferably annular and is disposed between the stop ring and the stop device. Hereby, an arrangement can be provided in a simple manner, by means of which a rotational angle range can be bridged. The maximum possible rotational angle can be increased in a simple manner hereby, for example from 330° to 380°. An arrangement "between" the stop ring and the stop device is preferably understood to be an arrangement where the stop ring and the stop device are not directly coupled to each other, but only indirectly by means of the rotary block. An arrangement "between" preferably means not only an arrangement operatively mounted between the stop ring and the stop device, but also an arrangement locally fully mounted between these components. An arrangement "between" preferably means that the stop ring does not engage the stop device particularly in the radial direction, but that an engagement or cooperation of the stop ring with the stop device (alone) is ensured by means of the rotary block.

According to an exemplary embodiment, the rotary block is arranged between the stop ring and the stop device and is mounted by surface abutment on the stop ring and/or the stop device. Hereby, an arrangement can be provided, in which a radial clearance can be realized in a simple manner, in particular independently of a specific rotational angle position.

According to an exemplary embodiment, the stop device is annular, wherein the stop device, the rotary block and the stop ring form an arrangement of three intermeshed concentric rings. The concentric arrangement in one another and around the first connection component has the advantage that the rotational angle and/or the rotation range can be adjusted independently of a certain rotational angle position around the entire circumference of the first connection component in the same manner. The concentric arrangement can also ensure that the stop mechanism functions independently of the respective adjusted rotation range or rotational angle in the same manner, in particular has the same rotational properties. The design of the stop mechanism with a plurality of rings respectively mutually encompassing each other also has the advantage that angular momenta can be transferred without causing large bending moments or lifting forces. The angular momenta can respectively be transferred as a torque about the rotational axis.

According to a variant, the stop ring has two or more stops, which are arranged opposite to each other and project in a radial direction on an outer casing surface of the stop ring and are provided in the axial direction preferably along the entire outer casing surface. By means of the stops being formed along the entire height or thickness of the stop ring, the stop ring and thus the stop mechanism can be formed in a relatively flat manner, which can also avoid large bending moments or lifting forces.

According to an exemplary embodiment, the stop device, the rotary block and the stop ring have respectively at least one radially inwardly projecting stop or a form-fit element and at least one radially outwardly projecting stop or a form-fit contour. Hereby, a torque or a rotational movement can be transferred from the first connection component gradually to the rotary block via the stop ring and by means of the rotary block on the stop device and further to the second connection component, and vice versa.

According to an exemplary embodiment, the stop mechanism is configured to transfer a rotational movement of the stop device to the rotary block in a rotationally synchronous manner, in particular from a rotational angle, in which corresponding stops engage with one another in a form-fit manner. In other words, the stop device is arranged or geometrically designed in such a manner that the rotary block can be taken along with the stop device, in particular when stops overlapping in the radial direction abut each other. The rotational movement can hereby be limited indirectly via the rotary block and the stop ring.

According to an exemplary embodiment, the rotary block has a radially outwardly arranged stop and at least one radially inwardly arranged counter stop, which ensure the respective rotation-blockable arrangement relative to the stop ring and relative to the stop device. A ring-in-ring arrangement can hereby be provided, in which the stops or counter stops can also be used to position the individual rings relative to one another, in particular also to center them.

The stop and/or the at least one counter stop is preferably positioned in a stationary manner on the rotary block. The stop or the counter stop can be provided integrally at the rotary block, i.e., the rotary block forms an integral part with the stop or the counter stop. Optionally, the stop or the counter stop or at least one counter stop of a plurality of counter stops can also be fastened to the rotary block, e.g. by means of a screw connection in the radial or axial direction. This facilitates e.g. the adjustment of a specific permissible rotational angle between the rotary block and the stop ring, in particular by offsetting a counter stop in the circumferential direction.

According to an exemplary embodiment, the counter stop of the stop device in the radial direction is arranged to overlap with the stop of the rotary block, wherein the counter stop of the rotary block is arranged in the radial direction overlapping with the at least one stop of the stop ring. This arrangement can ensure that the rotary block can be operatively arranged between the stop ring and the stop device as a rotation coupling element with a simple constructive design, in particular also with a flat design.

According to an exemplary embodiment, a ring cavity is formed between the stop ring and the rotary block, in which is arranged at least one counter stop of the rotary block. This enables a rotational angle-related form-fit between the rotary block and the stop ring, thus a form-fit with play from a certain relative rotational angle. The radial clearance can thereby be given by the size of the ring cavity. A ring cavity is preferably also formed between the rotary block and the adjustment ring, in which at least one stop of the rotary block is arranged. The rotary block can thereby be arranged between the stop ring and the stop device or the adjustment ring in such a manner that at least one stop can respectively be rotated with radial clearance in a ring cavity between the rotary block and the adjustment ring and at least one counter stop in a ring cavity between the rotary block and the stop ring.

According to an exemplary embodiment, the stop ring, in particular an outer casing surface of the stop ring, forms an abutment surface for the counter stop of the rotary block. Hereby, the rotary block can be mounted and guided with a relative rotation of the stop ring. The rotary block, in particular an outer casing surface of the rotary block, preferably also forms an abutment surface for the counter stop of the stop device. This can provide a stable arrangement which has good rigidity even with high angular momenta. In other words, the stop ring and the rotating block and/or the rotary block and the stop device respectively can form a bearing together, in particular a slide bearing.

A centering of the components can thereby also take place in different manners. In particular, the individual components can each or together be centered relative to each other. A centering may also be effected on the spindle and/or on the sleeve. Preferably, the stop ring on the spindle is centered, and the rotary block is centered via the stop ring and the stop device in the sleeve, in particular on a shoulder of the sleeve.

According to an exemplary embodiment, the rotary block has an inner surface or sliding surface arranged at the inner casing surface and is configured to rotate slidably with the inner surface at the stop ring. The stop device preferably also has an inner surface or sliding surface arranged at the inner casing surface and is configured to rotate slidably with the inner surface at the rotary block. The stop ring, the rotary block and the stop device can hereby be rotated relative to each other with low friction. By means of this type of slide bearing, a smoother stop mechanism can be provided, and the cooperation of the individual components of the rotatable connection can be optimized. The inner surface of the rotary block and/or the inner surface of the stop device are preferably respectively formed at a counter stop of the rotary block and the stop device.

The rotary block is preferably arranged between the stop ring and the stop device in such a manner that the stop device only abuts the rotary block (and not the stop ring), and that the stop ring also only abuts the rotary block (and not the stop device). In other words, the stop ring (preferably only) cooperates with the stop device by means of the rotary block. The respective (sliding) bearing for the individual components of the stop mechanism can hereby be provided in a simple and cost-effective manner and in particular also in low-maintenance form. Surface sections formed corresponding to each other in pairs can respectively provided. By means of the surface abutment of respectively only two of the components into each other, a robust stop mechanism can be provided. The respective mounting at surface sections of casing surfaces can thereby also ensure an exact positioning (in particular centering) of the components relative to each other and design the rotatable connection in a very robust and smooth-running manner. A mutual jamming can be avoided effectively.

A sliding surface is preferably understood to be a surface having a low coefficient of friction for sliding friction, whether due to a particularly low roughness or a particularly smooth surface, be due to a low friction material with lubricating properties. As material for the stop ring, for the rotary block or for the stop device or the adjustment ring e.g. zinc die cast can be used, either with or without coating. The three components can thereby consist of the same material or of different materials.

The stop device is preferably a one-piece, exposed and manually accessible part from which the counter stop preferably projects inwards in the radial direction, in particular from an inner casing surface of the stop device. The space requirement in the axial direction (the required height) can be are kept low hereby and a flat design can be realized. Preferably, the abutment means is the component of the stop mechanism, which is arranged farthest radially outwards. The stop device can hereby be arranged manually in an easily accessible manner, and an adjusting of the stop mechanism can optionally also take place without tools. The adjustment can nonetheless alternatively or additionally also take place automated with a motor.

According to an exemplary embodiment, of the adjustable stop mechanism is configured to adjust an rotation range with a relative rotational angle larger than 360°, in particular in the range from 360° to at least 420°. The rotational angle larger than 360° can in particular be ensured in that the rotary block is arranged not in an anti-rotation or anti-torsion manner, but is arranged only in a rotation-blockable manner with radial clearance at the stop device or the stop ring. The relatively large rotational angle of more than 360°, in particular up to 420° or even 460° or 480°, provides e.g. the advantage of a high flexibility when defining the action radius of individual support arms of the stand apparatus. The stops can be positioned, without reducing the freedom of movement of the stand apparatus disadvantageously. In contrast, with known rotatable connections, usually only a rotational (angle) range with a smaller maximum angle of about 330° can be adjusted, or the adjustment of the rotational angle range is not possible, or only in a very elaborate manner.

According to a variant, the rotatable connection or the stop mechanism has several rotary blocks which are coupled together. A rotational angle can be adjusted hereby, which can be significantly larger than the rotational angle, which can only be adjusted with a single rotary block.

According to an exemplary embodiment, the rotary block has two opposite counter stops, which are each formed over an arc ranging from 20° to 120°, preferably in the range of 25° to 100°, more preferably 30° to 90°. In this way, an arrangement can be provided, in which a rotational angle in the range of e.g. 45° to 160° can be bridged, depending on the arrangement or dimensions of the counter stops. The rotary block can thereby increase the maximum permissible rotational angle of the rotatable connection by a specific amount of e.g. 60° or 105° or 135°, depending on the constructive design or depending on the arrangement of the counter stops. A specific exemplary embodiment has e.g. counter stops, which are each arranged over a circular arc of 90°, for providing a rotational angle in the range of 360°. Another special exemplary embodiment has e.g. counter stops which are each arranged over a circular arc of 30°, for providing a rotational angle in the range of 420°.

According to an exemplary embodiment, the rotary block has a stop which is formed over a circular arc in the range of only 1° to 30°, preferably in the range of only 3° to 20°, more preferably of only 5° to 15°. By means of such a comparatively small circular arc extension, a stop mechanism can be provided which enables a large rotational angle, wherein the stop does not greatly restrict the maximum possible rotational angle.

According to an exemplary embodiment, the adjustable stop mechanism comprises a damping element, in particular made of elastomer material, which is arranged on a radial edge of at least one of the stops and/or counter stops. Hereby it can be ensured that, when the stops impinge on each other, a shock or an angular momentum is attenuated, whereby life span of the rotatable connection can be increased and/or the stand apparatus, in particular a medical device, can be protected. Angular momenta can in particular be damped effectively, in that the damping element can also prevent or at least attenuate swinging back or springing back of the support with a sudden abutment of the stops against each other. A damping element is thereby preferably understood to be an elastomeric element, in particular a rubber element with geometry adapted to the respective side face or radial edge. The damping element can e.g. have the form of a mat or plate. The damping element can e.g. be glued onto the respective surface. Optionally, the damping element can also be arranged at a radial edge of a stop provided at the second connection component.

By means of the arrangement at a radial edge, an angular momentum can be dampened particularly effectively at a single location. The damping element can be designed to be particularly simple and cost-efficient, e.g. plate-shaped. The damping element can also be designed particularly simple, e.g. via a certain thickness. The stop mechanism can also be adjusted by such a damping element in a simple manner, e.g. in that two damping elements are stacked or side by side, e.g. to adjust particularly high damping characteristics.

The damping element preferably has at least approximately the same extent in the axial direction, that is, the same thickness as the stop device, the stop ring and/or the rotary block. A damping at a relatively large surface section is ensured hereby. The damping element can also be made relatively thin thereby, so that a rotational angle range of the stop mechanism is not unnecessarily limited by the damping element.

According to an exemplary embodiment, the adjustable stop mechanism has an extension in the axial direction, which is smaller by a factor of 3, preferably a factor of 5, more preferably a factor of 7 than an outer diameter of the first connection component around which the stop mechanism can be arranged. The flat design in the axial direction, in particular in relation to a diameter of the first connection component, and thus also with respect to the occurring angular momenta, enables the arrangement of a plurality of stop mechanisms on a support system, without the installation space necessary in the axial direction for this increasing noticeably. However, the flat design also has the advantage that occurring angular momenta can be transferred without large lifting forces or bending moments between the individual components of the rotatable connection. Surface sections of stops impinging on each other in the circumferential direction thereby do not have to be manufactured with a particularly high degree of accuracy, or with a particularly narrow tolerance range, which can also reduce the manufacturing cost.

An outer diameter of the adjustable stop mechanism is preferably by a factor of 1.5, preferably a factor of 2, more preferably a factor of 2.5, greater than an outer diameter of the first connection component. By means of the extension in the radial direction, a particularly slim (flat) design can be achieved in the axial direction, whereby the rotatable connection can advantageously be used in particular with so-called central axes. By means of the flat design, a unique plane can be defined, in which angular momenta and torques are transferred. This also facilitates the design of the overall system, in particular with regard to sufficient rigidity.

According to an exemplary embodiment, the stop means, the stop ring and/or the rotary block have at least approximately the same extent, that is, the same thickness in the axial direction. This enables a flat design, whereby respectively surfaces of the stops impinging on each other can be used over the entire height or thickness of the respective component. Hereby, voltage peaks can also be avoided or the material stress can be kept low. A design in terms of all three components (stop device stop ring and/or rotary block) can also take place at the same time. As approximately the same torque is transferred between all three components, and at least approximately the same angular momentum is produced, the same material can e.g. be selected, and the mutually abutting surface sections or radial edges can be dimensioned in a comparable manner.

The stop device is preferably arranged in the axial direction at the same position or at least in the same axial region of the rotatable connection as the rotary block and the stop ring. The stop device preferably overlaps at least the rotary block in the axial direction. By arranging the rotary block and the stop device in the axial direction in an overlapping manner, the stop mechanism can be provided in the form of a flat constructed system. A good stability of the arrangement can also be ensured, in particular as the stop ring, the rotary block and the stop device can stabilize each other, especially about the respective inner and/or outer casing surface, in particular to avoid jamming.

The aforementioned object is also achieved by a support system for a stand apparatus for arrangement in an operating room and for positioning a medical device in the operating room, which has an inventive rotatable connection and the first connection component, in particular in the form of a spindle, and the second connection component, in particular in the form of a sleeve.

The components of the stand apparatus are preferably understood to be the support system, which components at least partially take over a function for holding and positioning the medical device. The support system can include a plurality of preferably rigid arms or supports displaceable relative to each other, as well as a plurality of levers, joints or bearings.

A medical device is preferably understood to be a lamp, a monitor and/or a supply console, by means of which means for care of a patient and/or instruments for a surgeon and/or light, clean air or other media needed in the operating room can be provided. The medical device preferably has any control panel and/or any display device for graphically displaying e.g. patient data.

According to an exemplary embodiment, a projecting stop is arranged on the second connection component in the axial direction, wherein said stop device is arranged on the same partial circle as the counter stop. A section of a ring cavity can hereby be formed between the stop of the second connection component and the counter stop of the stop device, in which cavity the stop of the rotary block can be arranged. The counter stop of the stop device can optionally be placed directly next to the stop of the second connection component, in particular to maximize the maximum adjustable rotational angle. A stop arranged in such a manner on the second connection component can, in connection with the stop device, provide an adjustable stop mechanism that can be adjusted particularly easily.

The stop preferably has an inner surface arranged on a partial circle and an outer surface arranged concentrically thereto. Hereby, the rotary block can be guided along the stop and be rotated on the one hand, on the other hand, the stop device can be positioned by means of the stop relative to the second connection component, in particular also centered. The stop of the second connection component can thereby be designed and used as an abutment surface or support bearing for the concentric arrangement of the components of the stop mechanism and used.

According to an exemplary embodiment, the second connection component is formed as a sleeve, in particular a fork-shaped sleeve, wherein the stop mechanism is arranged on a ring section of the sleeve. Thereby, the stop device mechanism can be coupled in a simple manner with the sleeve. The sleeve does not have to be redesigned in an elaborate manner. A stop can be mounted later to the sleeve, e.g., by screw connection. Preferably, the support system or the socket also includes a cover which is placed on the stop mechanism. This allows enables a covering of ring cavities between individual components of the stop mechanism. For adjusting the rotatable connection, the cover only has to be displaced in the axial direction according to one variant, where the rotary block is repositioned.

By means of the arrangement on the sleeve, a rotatable connection can also be provided, whose stop device can be accessed easily, be it either for a motor operation and/or for manual operation, which facilitates the adjustment of the rotational angle or rotational angle range. The individual components can be placed on the sleeve in a simple manner, particularly from above, and namely before the sleeve is pushed over the spindle.

According to an exemplary embodiment, the anti-rotation of the sleeve is arranged on the ring section, in particular on an upper surface of the ring section and has at least a web and an engagement element, wherein the engagement element can be fixed to the web in a predetermined position with respect to the radial and/or axial direction, in particular by means of a bolt guided through the web and the engagement element. The web or the engagement element preferably each have a passage for the bolt or the pin, by means of which the engagement element can be secured to the web. The engagement element can preferably be displaced in the radial and/or axial direction in a predetermined manner relative to the web, so that the engagement element can be displaced between a predefined engaged position and a predefined decoupled position, e.g. also in a pivotal manner, in particular also manually and without tools.

The above-mentioned object is solved by a stand apparatus for placement in an operating room and for positioning a medical device in the operating room, which comprises a rotatable connection according to the invention or the above-described support system with the rotatable connection according to the invention.

In a specific embodiment, the stand apparatus comprises for arrangement in an operating room and for positioning a medical device in the operating room comprises a support system with at least one support, in particular a support arm, with a sleeve mounted relative to a fixedly arranged part of the stand apparatus or to another support of the stand apparatus rotatable about a rotational axis on a spindle at a rotatable connection, in particular a rotatable connection according to the invention, wherein the rotatable connection has an adjustable stop mechanism which is arranged between the spindle and the sleeve mounted rotatably about the rotational axis relative to the spindle and is configured to define different relative rotational angles of the sleeve relative to the spindle or different rotation ranges, wherein the adjustable stop mechanism has:

- a stop ring having at least one stop and which is mounted to the spindle in an anti-rotation manner;
- an anti-rotation device, which is arranged at the sleeve in an anti-rotation manner;
- an adjustment ring with a counter stop, wherein the adjustment ring is mounted rotatably relative to the stop ring;
- an intermediate ring, which is mounted in an anti-rotational manner relative to the stop ring and relative to the adjustment ring;

wherein the adjustment ring can be positioned in different rotational angle positions at the rotation lock in an anti-rotational manner and is configured to define, by means of the counter stop together with the intermediate ring and the stop ring, a respective rotation range by relative rotation of these components to each other, wherein the adjustment ring has a form-fit contour in the form of individual teeth on an outer casing surface for defining individual rotational angle positions relative to the rotation lock, wherein the rotation lock has a pin or a bolt formed in geometrically corresponding manner to the teeth, wherein the intermediate ring is arranged between the stop ring and the stop device, wherein the adjustment ring, the intermediate ring and the stop ring form an arrangement of three concentric intermeshed rings, wherein a ring cavity is formed between the stop ring and the intermediate ring, in which cavity is arranged at least one counter stop of the intermediate ring, and wherein a ring cavity is formed between the intermediate ring and the adjustment ring, in which cavity is arranged at least a stop of the intermediate ring. By means of a stop mechanism with such an intermediate ring the stand apparatus, in particular individual supports relative to each other, can positioned in a flexible manner. The counter stop can be offset relative to the rotation lock in order to define a suitable rotational angle position, in particular with regard to a specific arrangement of the stand arrangement relative to other components in the operating room.

A support is thereby preferably understood to be a boom or a support arm which extends in a certain direction and can ensure the desired range for the different target positions of the medical device, in particular by a rotational movement about the rotatable connection. The support can optionally also be pivoted in height and/or displaced translationally in height. The support can also be a telescopic device with an (additional) degree of freedom in the translational direction along the longitudinal axis of the support. The support can at least partially, e.g. be formed by a continuous casting profile, in particular an aluminum extruded profile.

By means of the stop device, a rotation range of the rotatable connection, in particular a permissible relative rotational angle of the two connection components to each other can be defined.

The rotation lock is preferably arranged at one of the supports in the region of the rotatable connection. On one of the supports, a contour or a stop can be fixed in a stationary manner, whereby the support can be positioned in different rotational angle positions with regard to the other support or with regard to any other stationarily arranged part.

The aforementioned object is also achieved by a method for adjusting an adjustable stop mechanism of a rotatable connection for a stand apparatus for arrangement in an operating room, wherein a rotational angle or rotation range of a first connection component is adjusted relative to a second connection component by means of the stop mechanism, wherein the second connection component is mounted rotatably relative to the first connection component about a rotational axis, with the steps of:
  releasing a form-fit engagement between a stop device and an rotation lock, which is arranged in an anti-rotation manner at the second connection component, and namely by displacing an engagement element of the rotation lock relative to the stop device; and
  defining the rotational angle or rotation range of the connection components relative to each other by rotating the rotary block about the rotational axis relative to the second connection component, and thereafter form-fit engagement of the engagement element at the stop device. Thereby, only a relative rotation has to take place, no axial displacement. The stop mechanism can thereby be adjusted in a particularly simple manner, in particular by rotating the stop device. The rotation can take place in increments, which, for example, are determined by individual teeth of a form-fit of the stop device. The advantages described in connection with the rotatable connection result in particular also with such a method.

By means of rotating the stop device about the rotational axis relative to the second connection component, an arc extension of a ring cavity formed between the stop device and a rotary block can thereby be adjusted. The individual method steps can be carried out by conventional motors, actuators or drives, wherein the stand apparatus can comprise a control device, by means of which a plurality of motors, actuators or drives can be controlled and regulated. The adjusting/adapting can e.g. be automated by means of a servo motor, which, is connected to the stop device by e.g. spur gears. The method can at least partially also be supported manually, wherein a user, can e.g. engage an outer casing surface or form-fit contour of the stop device.

According to an advantageous embodiment, the method further comprises the steps of: —releasing a form-fit engagement between the stop device and a stop of a rotary block, which is arranged within the stop device, and namely by axially displacing the rotary block along the rotational axis and pulling out the stop from a first section of a ring cavity formed between the stop device and the rotary block, in particular from a section which is arranged on a first side of a stop of the second connection component; and defining the rotational angle or rotation range of the connection components relative to each other by rotating the rotary block about the rotational axis relative to the second connection component, and thereafter axial shifting back of the rotary block and form-fit engagement of the stop into a second section of the ring cavity, in particular into a section which is arranged on a second side of the stop of the second connection component. The stop of the rotary block can hereby be translated from a first section of the ring cavity into a second section of the ring cavity, in particular to the other side of a stop device of the second connection component. This facilitates in a simple manner to change the permissible rotational angle by a large amount. The stop device thereby does not have rotated by a large rotational angle. By means of the translation of the stop of the rotary block, a rotational angle and a rotational position can be adjusted in a simple manner, in particular with high flexibility and variance of the stop mechanism. Further, individual advantages described in connection with the rotatable connection also result thereby. The step of defining preferably comprises the defining of a rotation range.

The aforementioned object is also achieved by a method for adjusting an adjustable stop mechanism of a rotatable connection for a stand apparatus for arrangement in an operating room, wherein a rotational angle or rotational range of a first connection component is adjusted relative to a second connection component by means of the stop mechanism, wherein the second connection component is rotatably mounted relative to the first connection component about a rotational axis, with the steps of:
  releasing a form-fit engagement between a stop device and a stop of a rotary block, which is arranged within the stop device, and namely by axially displacing the rotary block along the rotational axis and pulling out the stop from a first section of a ring cavity formed between the stop device and the rotary block, in particular from a section which is arranged on a first side of a stop of the second connection component; and
  defining the rotational angle or rotation range of the connection components relative to each other by rotating the rotary block about the rotational axis relative to the second connection component, and thereafter axial shifting back of the rotary block and form-fit engagement of the stop into a second section of the ring cavity, in particular into a section which is arranged on a second side of the stop of the second connection component. The stop of the rotary block can hereby be translated from a first section of the ring cavity into a second section of the ring cavity, in particular to the other side of a stop device of the second connection component. This facilitates in a simple manner to change the permissible rotational angle by a large amount. The stop device thereby does not have to be rotated at all. No actuation of the rotation lock has to take place. A displacement of any engagement element is not at all required. By means of the translation of the stop of the rotary block, a rotational angle and a rotational position can be adjusted in a simple manner, in particular with high flexibility and variance of the stop mechanism. By means of such a method, the advantages described in connection with the rotatable connection also result in particular. The step of defining preferably comprises the defining of a rotation range.

BRIEF DESCRIPTION OF THE SEVERAL VIEWS OF THE DRAWING(S)

Figure 1B:
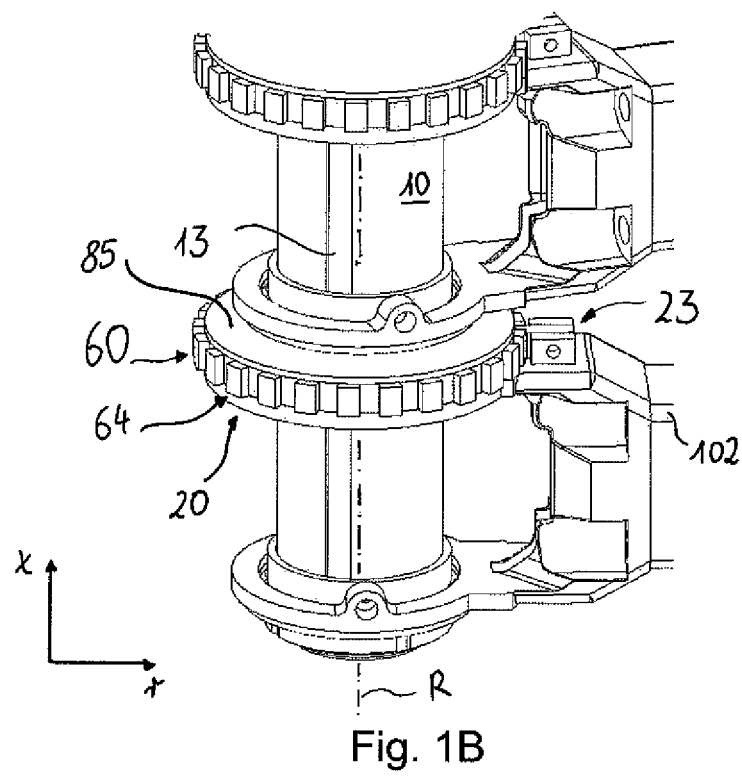
Figure 2:
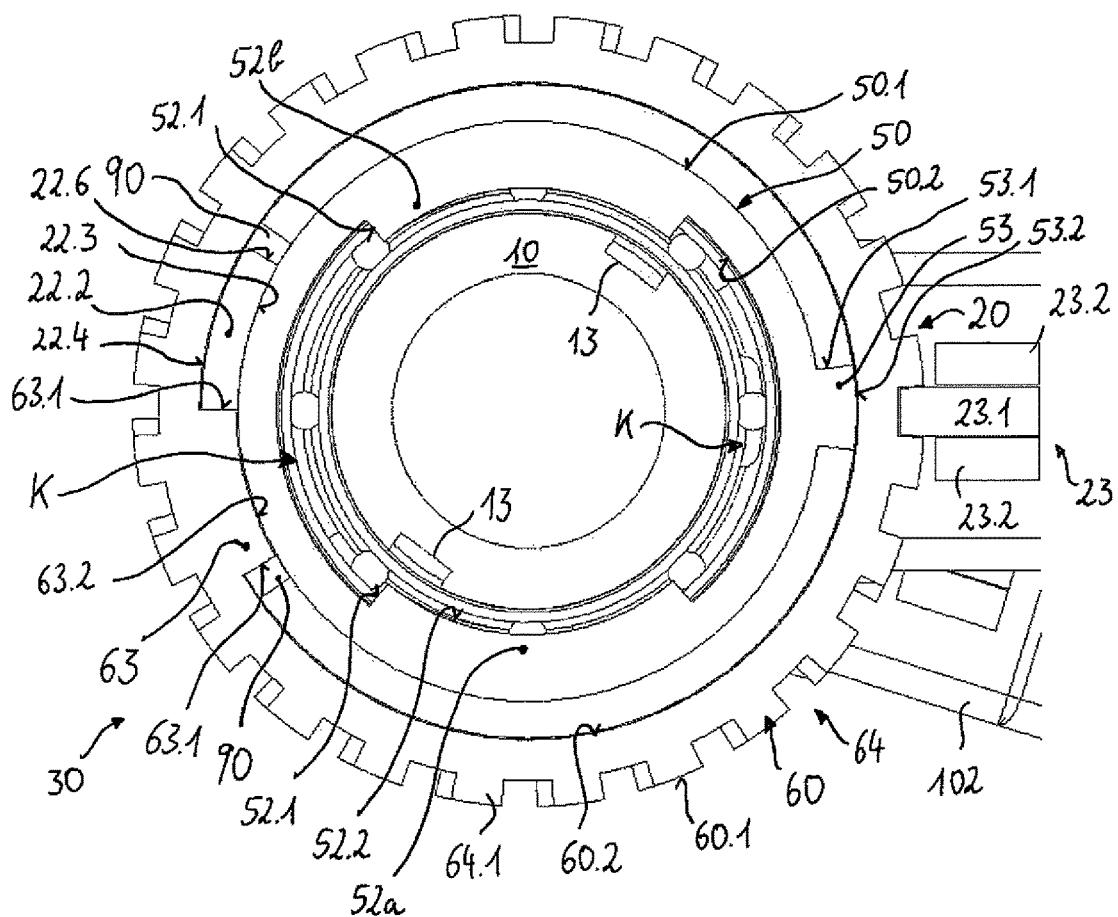
Figure 3:
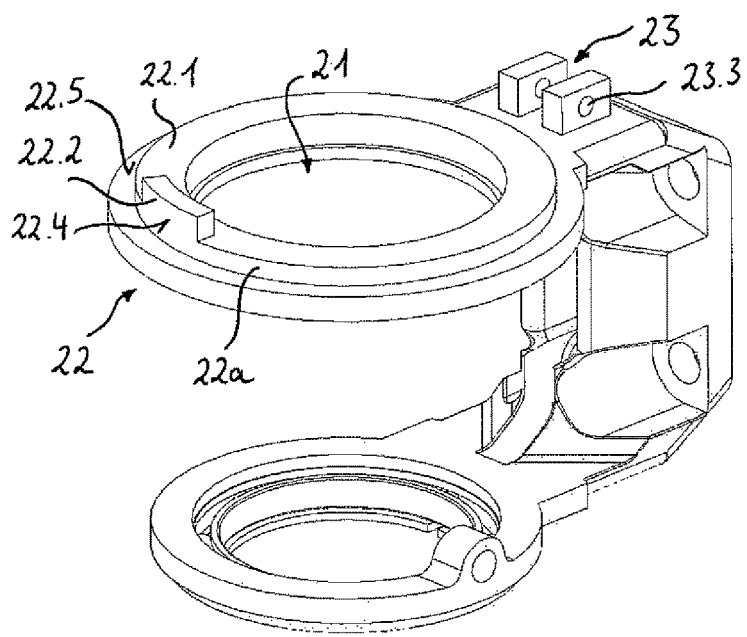

In the following drawing figures, the invention is explained in more detail by means of an exemplary embodiment. It shows:

FIG. 1A a rotatable connection according to an exemplary embodiment of the invention in a schematic illustration in a perspective view;

FIG. 1B the rotatable connection according to the exemplary embodiment shown in FIG. 1A in a perspective side view;

FIG. 2 the rotatable connection according to the exemplary embodiment shown in FIG. 1A, 1B in a plan view;

FIG. 3 a sleeve in a perspective side view, on which a rotatable connection according to the exemplary embodiment shown in FIG. 1A to 2 can be arranged.

Figure 4A:
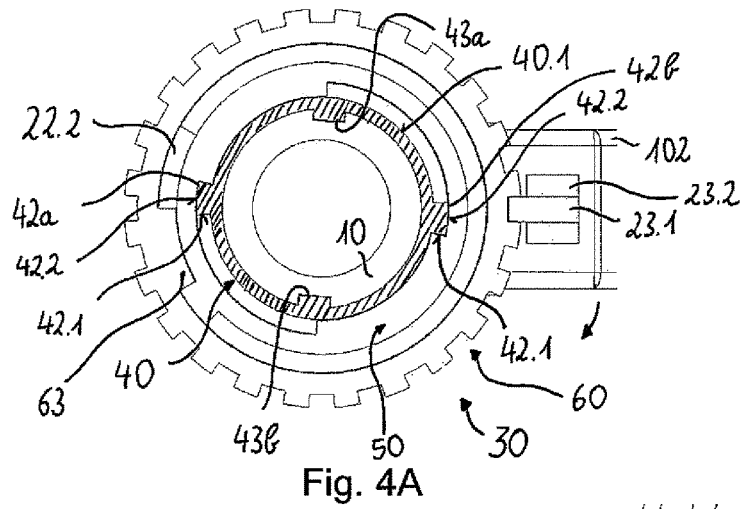
Figure 4B:
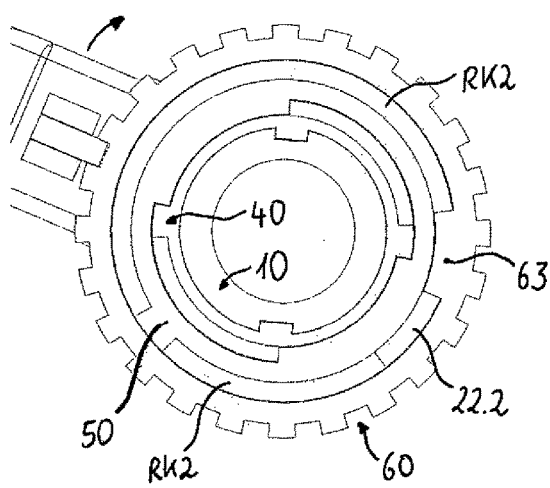
Figure 4C:
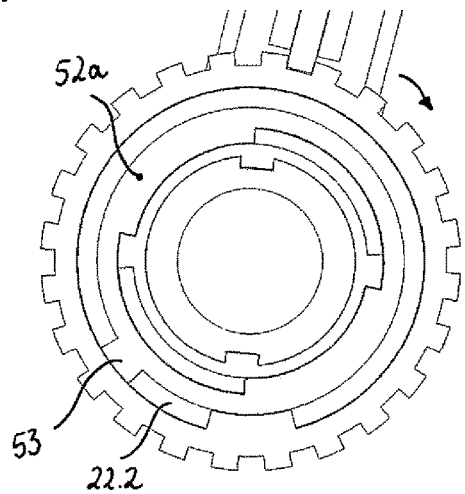
Figure 4D:
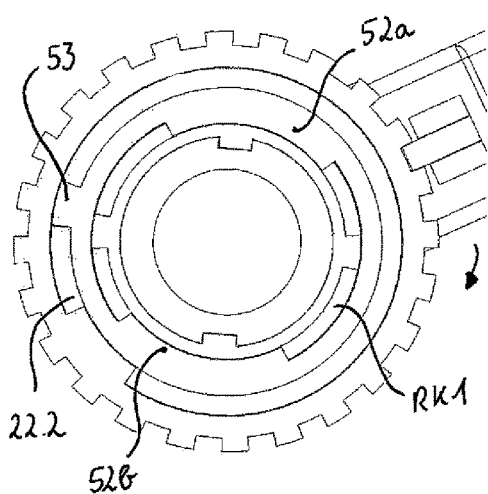
Figure 4E:
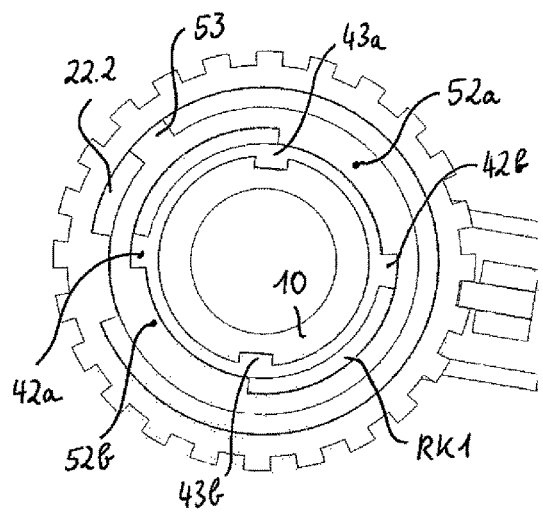
Figure 5A:
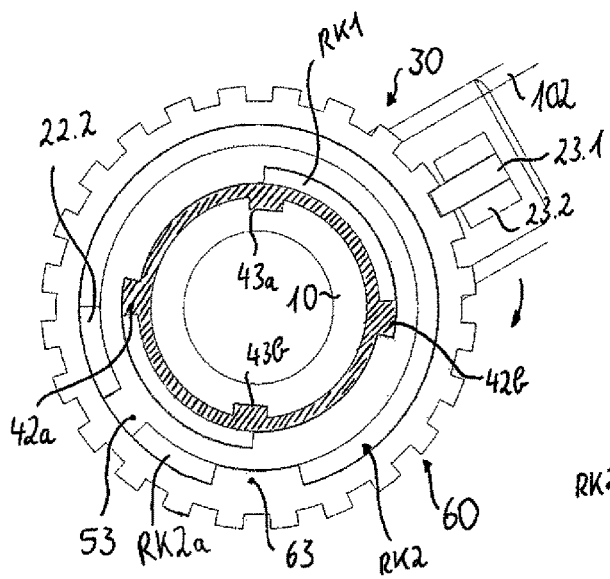
Figure 5B:
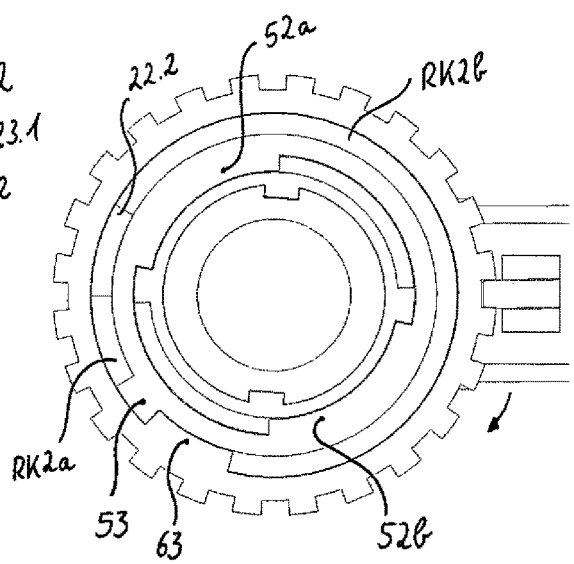
Figure 5C:
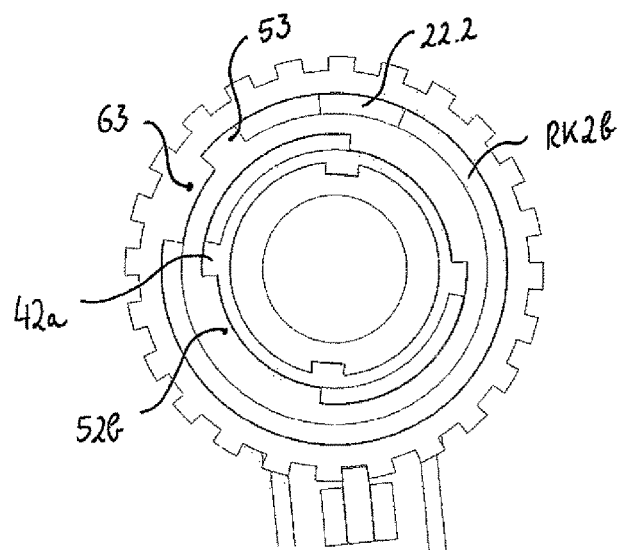

FIGS. 4A to 4E the rotatable connection according to the exemplary embodiment shown in FIG. 1A to 2 respectively in a plan view in different rotational angle positions in an arrangement for a relative rotation of more than 360° in the clockwise direction; and FIGS. 5A to 5C the rotatable connection according to the exemplary embodiment shown in FIG. 1A to 2 respectively in a plan view in different rotational angle positions in an arrangement for a relative rotation of about 125° clockwise in accordance with that shown in FIGS. 1A to 2 embodiment in different rotational angular positions, in an arrangement for relative rotation of about 125° in the clockwise direction.

DETAILED DESCRIPTION OF THE INVENTION

In connection with the description of the following figures, the further figures are referred to with individual reference numerals in case they are not explicitly explained in connection with a particular figure.

In FIG. 1A, a stand apparatus 100 is indicated, which comprises a support system 101 consisting of several supports or arms 102. The stand apparatus 100 can e.g. be arranged in an operating room. A rotary joint 1 ensures that the individual supports 102 can be displaced in an adjustable action radius. The rotatable connection 1 comprises an adjustable stop mechanism 30 which is arranged around a spindle 10 and is thereby supported in a sleeve 20 or on the sleeve. Two supports 102 are shown, which are mounted on the spindle 10 respectively by means of an adjustable stop mechanism 30. The adjustable stop mechanism 30 comprises a stop device 60, which has planar faces or face sections 61, in particular, an at least partially planar top and bottom. The stop device 60 can hereby be arranged on a geometrically correspondingly formed surface, in particular top, of the sleeve and at the same time can provide an abutment surface for a lid or cover (not shown).

In FIG. 1B, only the stop device 60 of the adjustable stop mechanism 30 is visible. The stop device 60 is an adjustment ring in this exemplary embodiment, which has a form-fit contour 64, in which engages an rotation lock 23 arranged in an anti-rotational manner at the sleeve 20 or at the support 102 in the radial R-direction. The sleeve 20 is rotatably mounted about a rotational axis R about the spindle 10. The spindle 10 has an rotation lock or a groove 13, into which one of the components of the stop mechanism 30 can engage in an anti-rotational manner. The rotation lock 23 is adjustable, as described in more detail in connection with FIGS. 2 and 3, so that the adjustment ring 60 can be positioned in different rotational angle positions relative to the support 102 or to the sleeve 20 in order to adjust or adapt the stop mechanism 30. This can also take place manually in a simple manner and in particular without tools, as the rotation lock 23 is arranged on a top side of the sleeve 20 and of the support 102 in an easily accessible manner.

The stop mechanism 30 does not only have the adjustment ring 60, but also two more rings (not shown) arranged concentrically thereto. All three components have substantially the same thickness (extension in the axial x-direction along the rotational axis R). The stop mechanism 30 can be covered by a cover 85, in particular an annular plate-like lid. Hereby it can be avoided that any foreign objects or dirt reaches the cavities, which are formed between the individual components of the stop mechanism 30.

FIG. 1B clearly shows the extremely flat design of the stop mechanism 30. The stop mechanism can be arranged at the socket 20 in a simple manner without the support system 101 having to have larger dimensions thereby. Rather, the stop mechanism 30 is designed in such a flat manner that an integration into the sleeve 20 is possible without the dimensions in the axial direction having to become be greater, or at best only marginally. Hereby, several sleeves or supports can be arranged one above the other, without the space requirement in the axial direction increasing noticeably (in height). This can e.g. also be advantageous with more complex stand apparatuses for a plurality of medical devices in operating rooms with low room heights. The stop mechanism 30 has e.g. a thickness or height in the range of only 1 to 3 cm. According to a special embodiment, the stop mechanism 30 has a thickness or height of 10 mm with a diameter of the spindle of 60-80 mm. The thickness of the stop mechanism 30 can thereby be designed e.g. in dependence on the angular momenta. The thickness or height of the stop mechanism 30 can thereby correspond at least approximately to e.g. the axial extent of the rotation lock 23, so that the angular momenta or torques between the spindle 10 and the sleeve 20 can be transferred respectively via the same surface or the same axial position.

In FIG. 2, individual components of the stop mechanism 30 are shown in detail, wherein a stop device ring of the stop mechanism 30 is only shown in FIGS. 4A to 5C. Thereby, an adjustment ring of the upper rotatable connection shown in FIG. 1B and an adjustment ring of the lower rotatable connection shown in FIG. 1B is can be seen. The form-fit contours of the adjustment rings are slightly twisted with regard to each other, in particular by an angle of approximately 50, so that both form-fit contours can be seen.

The stop mechanism 30 has the adjustment ring 60 and a rotary block 50, which are, together with the stop ring, arranged concentrically around the spindle 10. The stop ring can be arranged in the cavity K formed between the rotary block 50 and shaft 10.

The rotary block 50 has two opposed stops 52a, 52b, which project radially inwardly at an inner surface 50.2 of the rotary block 50. The stops 52a, 52b respectively have two radial edges 52.1 and a concave radially outwardly curved inner surface 52.2. Further, the rotary block 50 has a stop 53, which projects radially outwardly at an outer surface 50.1 of the rotary block 50. The stop 53 has two planar opposite side surfaces (radial edges) 53.1, which are configured for transmitting an angular momentum. Further, the stop device 53 has a convex radially outwardly curved outer surface 53.2 along which the adjustment ring 60 can slide.

The adjustment ring 60 has a radially inwardly projecting counter stop 63 at an inner casing surface 60.2 with a concave outwardly curved inner surface 63.2, along which the rotary block 50 can slide with an outer casing surface 50.1. Further, the counter stop 63 has two planar opposite side surfaces (radial edges) 63.1, which are configured for transmitting an angular momentum.

The adjustment ring 60 and the rotary block 50 and the stop ring, not shown, are arranged concentric to each other and concentric to the spindle 10.

The rotation lock 23 has two webs 23.2 and an engagement element 23.1 that can be fixed therebetween. For the fixation, a passage 23.3 can be provided on the webs 23.3 and on the engagement element, as shown in FIG. 3. The engagement element 23.1 radially engages the adjustment ring 60 between two teeth 64.1 of the form-fit contour 64. The teeth 64.1 are arranged on an outer casing surface 60.1 of the adjustment ring 60. The individual rotational angle positions of the adjustment ring 60 can be defined by means of the form-fit contour 64 and the engagement element 23.1.

The sleeve 20 has a stop 22.2 projecting in the axial direction, at which the adjustment ring 60 abuts radially outwardly. The stop 22.2 of the sleeve is provided integrally at a ring section 22 of the sleeve 20, in particular cast on, and forms a structure rotatable about the rotational axis together with the sleeve 20, as shown in FIG. 3.

A damping element 90 in the form of an elastic plate or mat is respectively arranged at one of the radial edges 63.1 of the counter stop 63 and at one of the radial edges 22.6 of the stop 22.2 of the sleeve.

The rotary block or the intermediate ring 50 thereby serves to increase the achievable rotational angle. The end of the rotation range can thereby be adjusted by the orientation of the spindle 10. The stop mechanism can e.g. be adjusted in that the engagement element 23.1 of the rotation lock 23 is released and the adjustment ring 60 is rotated into the desired position, and the engagement element 23.1 is thereupon again brought into engagement with the adjustment ring 60. If the stop 22.2 of the sleeve and the counter stop 63 of the adjustment ring 60 are arranged directly next to each other, the largest rotational angle can be realized. The used damping elements 90 can absorb the kinetic energy of a respective support when reaching the stop.

In FIG. 3, the arrangement of the stop 22.2 on the sleeve 20 is shown in detail. The sleeve 20 is fork-shaped and comprises two ring sections 22, each having a passage 21 for the spindle 10, wherein an annular edge 22a with a radially outwardly convexly curved outer surface 22.4 is formed at the upper ring section 22. The stop 22.2 projects from a face section 22.1 of the annular rim 22a in an axial upward direction. The outer surface of the stop 22.2 is arranged on the same partial circle as the curved outer surface 22.4. The curved outer surface 22.4 also forms the outer surface of the stop 22.2. The upper ring section 22 further includes an annular abutment surface 22.5 for the adjustment ring 60, wherein the adjustment ring 60 can optionally be mounted on the face section 22.1 and/or on the abutment surface 22.5. This design of the sleeve 20 enables a constructionally arrangement of the stop mechanism 30 on the sleeve 20 in a simple manner.

The stop 22.2 further comprises a concave radially outwardly curved inner surface 22.3 and well as the two planar side surfaces (radial edges) 22.6. The rotary block 50 can slide along the inner surface 22.3.

In FIGS. 4A to 4E, an arrangement is shown by means of which a rotation range can be adjusted with a rotational angle larger than 360°, in particular about 375° or 380° in an exemplary manner. FIGS. 4A to 4E show five different positions of the support 102 or of the sleeve relative to the spindle 10, wherein the spindle 10 together with the stop ring 40 remains arranged in a single fixed position.

In FIGS. 4A to 4E, the three concentric intermeshed components 40, 50, 60 of the stop mechanism are shown. The stop ring 40 has two radially inwardly arranged projections or springs 43a, 43b, which engage in the spindle 10 and ensure an anti-rotation arrangement of the stop ring 40 relative to the spindle 10. The springs are integrally formed on the stop ring 40. Optionally, the springs 43a, 43b can respectively be replaced by feather keys, which can be inserted on an inner circumferential surface in corresponding grooves of the stop ring 40. The fixed structure can thereby be provided by the spindle 10 in connection with the stop ring 40, the stop ring 40 being rotationally connected to the spindle 10 via a groove-spring connection 13, 43a, 43b in an anti-rotation manner. For this, the stop ring 40 has two radially inwardly projecting form-fit elements or springs 43a, 43b, which are formed on an inner casing surface of the stop ring 40 geometrically corresponding to two grooves 13 in the spindle 10, as shown in FIG. 1B.

The stop ring 40 further includes two stops 42a, 42b, which project outwardly in the radial direction on an outer casing surface 40.1 of the stop ring 40. The stops 42a, 42b each have radial edges 42.1, at which the rotary block 50 can abut. Furthermore, the stops 42a, 42b respectively have convexly radially outwardly curved outer surfaces 42.2, along which the rotary block 50 can slide.

Starting from the position shown in FIG. 4A, the sleeve or the support 102 is rotated around the spindle 10 in the clockwise direction, as indicated by the arrow.

In FIG. 4b, the support is shown rotated by somewhat more than 180° around the spindle 10. Together with the support, the stop 22.2 of the sleeve and the adjustment ring have been rotated. The intermediate ring 50 is still arranged in the same position as in FIG. 4A. In FIG. 4C, the stop 22.2 was rotated to the stop 53 of the intermediate ring 50. From this rotational position, the intermediate ring 50 is taken along or rotated by means of the stop 22.2. In FIG. 4D, a rotational position is shown in which the intermediate ring was rotated relative to the stop ring. In FIG. 4E, an end position shown, corresponding to a rotational angle of about 375°. In the end position, the counter stops 52a, 52b of the intermediate ring abut the stops 42a, 42b of the stop ring. The rotation is now blocked. An angular momentum is transferred from the stop 22.2 to the stops 42a, 42b via the stop 53 and the counter stops 52a, 52b and transferred to the spindle 10 via the form-fit elements 43a, 43b of the stop ring 40.

The relatively large relative rotational angle in the exemplary embodiment shown in FIGS. 4A to 4E can be adjusted so that the stop 53 of the rotary block 50 22.2 is arranged in a ring cavity RK2 between the stop 22.2 of the sleeve and the counter stop 63 of the adjustment ring 60, which extends over a circular arc as maximally large as possible of e.g. 310° to 330°. In other words: the stop 22.2 of the sleeve and the counter stop 63 of the adjustment ring 60 are arranged directly next to each other, and the stop 53 of the rotary block 50 is disposed in the ring cavity RK2, wherein the ring cavity RK2 extends over a maximally large circular arc, in the exemplary embodiment shown in particular over about 295°. The stop 53 of the rotary block 50 can thereby rotate through a circular arc of about 295° relative to the adjustment ring 60 or to the sleeve. Relative to the stop ring 40, the rotary block 50 can then rotate together with the adjustment ring 60 and the sleeve about 85°, so that the sum is an adjusted rotational angle of about 380°.

In order to design the arc of the ring cavity RK2 with a maximum size, in particular e.g. in the range of 400° or 425°, the stop 22.2 and the counter stop 63 can have a circular arc extension as small as possible, e.g. in the range of respectively less than 10°, preferably less than 7°, or even less than 5° or 4° or 3°, if the rigidities of the materials used permit this. Optionally, the circular arc extension of the counter stops 52a, 52b of the rotary block 50 can also be reduced, e.g. from about 90° to about 60°. The circular arc extension of the ring cavity are RK1 between the stop ring 40 and the rotary block 50 can be increased hereby, which enables a larger relative rotational angle possible.

In FIGS. 5A to 5C is shown an arrangement in which the support 102 or the sleeve are initially rotated together with the adjustment ring 60 by about 40° in the clockwise direction relative to the rotary block 50, the stop ring 40 and the spindle 10, until the counter stop 63 abuts the stop 53 of the rotary block 50, as shown in FIG. 5B. The rotary block 50 thereby remains static at first in the same position relative to the stop ring 40. The stop 53 of the rotary block 50 is located in FIG. 5A at the stop 22.2 of the sleeve, and in FIG. 5B, the stop 22.2 of the sleeve is rotated further in the clockwise direction by about 40°, and the stop 53 of the rotary block 50 abuts the counter stop 63 of the adjustment ring 60. From the rotational position shown in FIG. 5B, the rotary block 50 is therefore rotated together with the adjustment ring in the clockwise direction. The stop 22.2 of the sleeve rotates at the same rate, i.e., the distance between the rotary block 50 and the stop device 22.2 now remains unchanged, as shown in FIG. 5C.

The relatively small relative rotational angle in the exemplary embodiment shown in FIGS. 5A to 5C can be adjusted in that the stop 53 of the rotary block 50 is arranged in a first section RK2a of a ring cavity RK2 between the rotary block 50 and the adjustment ring 60, namely between the stop 22.2 of the sleeve and the counter stop 63 of the adjustment ring 60. The first section RK2a thereby extends over an arc of e.g. only 60°. In other words: the stop 22.2 of the sleeve and the counter stop 63 of the adjustment ring 60 are located relatively close to each other, and the stop 53 of the rotary block 50 is arranged between them. The stop 53 can thereby rotate through an arc of about 40° relative to the adjustment ring 60 or to the sleeve. The rotary block 50 can then still rotate together with the adjustment ring 60 and the sleeve relative to the stop ring 40 around about 85°, namely by the counter stops 52a, 52b being rotated in a/the ring cavity RK1 between the stop ring 40 and the rotary block 50, so that an adjusted rotational angle of about 125° results as the sum. Thereby, no stop is arranged in a second section of the ring cavity RK2b of the ring cavity RK2 between the rotary block 50 and the adjustment ring 60. In this section of the ring cavity, no relative rotational movement takes place.

Embodiments of the invention relate to a rotatable connection for a stand apparatus for arrangement in an operating room, comprising an adjustable stop mechanism, which can be arranged between a first connection component and a second connection component mounted rotatably about a rotational axis relative to the first connection component and which is configured to define different rotational angles or rotation ranges of the connection components relative to each other, wherein the adjustable stop mechanism comprises: a stop ring having at least one stop and which can be mounted to the first connection component in an anti-rotational manner; an anti-rotation device, which can be arranged at the second connection component in an anti-rotational manner; a stop device with a counter stop, which is rotatably mounted relative to the stop ring; and a rotary block, which is mounted relative to the stop ring and relative to the stop device in a rotation-blocking manner; wherein the stop device can be positioned at the anti-rotation device in different rotational angle positions in an anti-rotational manner and is configured to define a respective rotation range by means of the counter stop together with the rotary block and the stop ring by means of relative rotation of these components to each other. The invention further relates to a support system or a stand apparatus with such a rotatable connection and a method for adjusting the adjustable stop mechanism.

LIST OF REFERENCE NUMERALS

1 Rotatable connection
10 First connection component, in particular spindle
13 Anti-rotation device, in particular groove in outer casing surface
20 Second connection component, in particular sleeve
21 Passage for the first joint member
22 Ring section of the fork-shaped sleeve
22a Annular rim
22.1 Face section
22.2 Stop at the sleeve, in particular stop projecting in the axial direction
22.3 Concave or concavely radially outwardly curved inner surface at the stop
22.4 Convex or convexly radially outwardly curved outer surface at the stop
22.5 Abutment surface, in particular annular, for the stop device
22.6 Side surface (radial edge), in particular planar stop surface
23 Anti-rotation device
23.1 Engagement element
23.2 Web
23.3 Passage
30 Adjustable stop mechanism
40 Stop ring
40.1 Outer casing surface
42a First stop, in particular stop arranged radially outwardly
42b Second stop, in particular stop arranged radially outwardly
42.1 Side surface (radial edge), in particular planar stop surface
42.2 Convex or convexly radially outwardly curved outer surface
43a First form-fit element, in particular spring
43b Second form-fit element, in particular spring
50 Rotary block, in particular intermediate ring
50.1 Outer casing surface 50.2 Inner surface
52a First counter stop, in particular radially inwardly arranged counter stop
52b Second counter stop, in particular radially inwardly arranged counter stop
52.1 Side surface (radial edge), in particular planar stop surface
52.2 Concave or concavely radially outwardly curved inner surface
53 Stop, in particular radially outwardly arranged stop
53.1 Side surface (radial edge), in particular planar stop surface
60 Stop device, in particular adjustment ring
60.1 Outer casing surface
60.2 Inner casing surface
61 Planar face(s), in particular planar top and bottom side
63 Counter stop, in particular radially inwardly arranged counter stop
63.1 Side surface (radial edge), in particular planar stop surface
63.2 Concave or concavely radially outwardly curved inner surface
64 Form-fit contour
64.1 Single tooth
85 Cover, in particular annular cover
90 Damping element
100 Stand apparatus
101 Support system
102 Support
K Cavity between the spindle and intermediate ring
R Rotational axis
RK1 Ring cavity between the stop ring and rotary block
RK2 Ring cavity between the rotary block and adjustment ring
RK2a First section of a ring cavity between the rotary block and adjustment ring
RK2b Second section of a ring cavity between the rotary block and adjustment ring
x Axial direction
r Radial direction

The invention claimed is:

1. A rotatable connection for a stand apparatus for arrangement in an operating room, comprising:
an adjustable stop mechanism, which is arranged between a first connection component and a second connection component mounted rotatably about a rotational axis relative to the first connection component and which is configured to define different rotational angles or rotation ranges of the first and second connection components relative to each other,
wherein the adjustable stop mechanism comprises:
a stop ring having at least one stop and which is mounted to the first connection component in an anti-rotational manner;
an anti-rotation device, which is arranged at the second connection component in an anti-rotational manner;
a stop device with a counter stop, which is rotatably mounted relative to the stop ring; and
a rotary block, which is mounted relative to the stop ring and relative to the stop device in a rotation-blocking manner,
wherein the stop device is positioned at the anti-rotation device in different rotational angle positions in an anti-rotational manner and defines a respective rotation range by means of the counter stop together with the rotary block and the stop ring by means of relative rotation of the first connection component and the second connection component to each other.

2. The rotatable connection according to claim 1, wherein the stop ring, the rotary block and the stop device of the stop mechanism are arranged relative to each other in such a manner that a rotational movement can be transferred between the connection components by means of a form fit.

3. The rotatable connection according to claim 1, wherein the stop device has a form-fit contour for defining individual rotational angle positions relative to a rotation lock at an outwardly facing casing surface, wherein the rotation lock has an engagement element corresponding geometrically to the form-fit contour.

4. The rotatable connection according to claim 1, wherein the rotary block is annular and is arranged between the stop ring and the stop device, wherein the stop device is also annular, and wherein the stop device, the rotary block and the stop ring form an arrangement of three concentric rings mounted into each other.

5. The rotatable connection according to claim 1, wherein the stop device, the rotary block and the stop ring respectively have at least one radially inwardly projecting stop or a form-fit element and at least one radially outwardly projecting stop or a form-fit contour.

6. The rotatable connection according to claim 1, wherein a ring cavity is formed between the stop ring and the rotary block, in which cavity is arranged at least one counter stop of the rotary block, and/or wherein a ring cavity is formed between the rotary block and the stop device, in which cavity is arranged at least one stop of the rotary block.

7. The rotatable connection according to claim 1, wherein an outer casing surface of the stop ring forms a contact surface for a counter stop of the rotary block, and/or wherein an outer casing surface of the rotary block forms an abutment surface for the counter stop of the stop device.

8. The rotatable connection according to claim 1, wherein the rotary block has an inner surface arranged at an inner casing surface and is configured to rotate with the inner surface at the stop ring in a sliding manner, and/or wherein the stop device has an inner surface arranged at an inner casing surface and is configured to rotate with the inner surface at the rotary block in a sliding manner, wherein the inner surface of the rotary block and/or the inner surface of the stop device is respectively formed at a counter stop of the rotary block and the stop device.

9. The rotatable connection according to claim 1, wherein the adjustable stop mechanism has a damping element made of an elastomeric material, which is arranged at a radial edge of at least one of the stops and/or counter stops.

10. The rotatable connection according to claim 1, wherein the adjustable stop mechanism has an extension into the axial direction, which is smaller than an outer diameter of the first connection component by a factor of 3 or a factor of 5 or a factor of 7, around which the stop mechanism can be arranged, wherein the stop device, the stop ring and/or the rotary block have at least approximately the same extension in the axial direction.

11. A method for adjusting the adjustable stop mechanism of the rotatable connection according to claim 10, which is arranged on the stand apparatus for arrangement in the operating room, wherein a rotational angle or rotation range of the first connection component relative to the second connection component is defined by means of the stop mechanism, wherein the second connection component is rotatably mounted relative to the first connection component about the rotational axis, the method comprising:

releasing a form-fit engagement between the stop device and the stop of the rotary block, which is arranged within the stop device, by axially displacing the rotary block along the rotational axis and pulling out the stop from a first section of a ring cavity formed between the stop device and the rotary block, from a section which is arranged on a first side of a stop of the second connection component; and defining the rotational angle or rotation range of the connection components relative to each other by rotating the rotary block about the rotational axis relative to the second connection component, and thereafter axial shifting back of the rotary block and form-fit engagement of the stop into a second section of the ring cavity, into a section which is arranged on a second side of the stop of the second connection component.

12. A support system for the stand apparatus for arrangement in the operating room and for positioning a medical device in the operating room, comprising the rotatable connection according to claim 1 and the first connection component in a form of a spindle, and the second connection component in a form of a sleeve, wherein a stop projecting in the axial direction is arranged at the second connection component, which stop is arranged on the same partial circle as the counter stop of the stop device.

13. The support system according to claim 12, wherein the second connection component is formed as a fork-shaped sleeve, wherein the stop mechanism is arranged on a ring section of the sleeve, wherein the support system or the sleeve has a cover which is placed on the stop mechanism.

14. The stand apparatus for arrangement in the operating room and for positioning the medical device in the operating room, comprising the rotatable connection according to claim 1.

15. A method for adjusting the adjustable stop mechanism of the rotatable connection according to claim 1, which is arranged at the stand apparatus for arrangement in the operating room, wherein a rotational angle or rotation range of the first connection component relative to the second connection component is adjusted by means of the stop mechanism, wherein the second connection component is rotatably mounted relative to the first connection component about the rotational axis, the method comprising:

releasing a form-fit engagement between the stop device and a rotation lock which is arranged secured against rotation on the second connection component, by displacing an engagement element of the rotation lock relative to the stop device; and defining the rotational angle or rotation range of the connection components relative to each other by rotating the stop device about the rotational axis relative to the second connection component, and thereafter form-fit engagement of the engagement element on the stop device.

* * * * *